US010005954B2

(12) United States Patent
Raysoni et al.

(10) Patent No.: US 10,005,954 B2
(45) Date of Patent: Jun. 26, 2018

(54) PLANT EXTRACTED OIL BASED POLYEPOXY RESIN COMPOSITION FOR IMPROVED PERFORMANCE OF NATURAL SAND PLACED IN FRACTURE

(71) Applicant: HALLIBURTON ENERGY SERVICES, INC., Houston, TX (US)

(72) Inventors: Neelam Deepak Raysoni, Pune (IN); Rajender Salla, Pune (IN); Sushant Dattaram Wadekar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/315,346

(22) PCT Filed: Jul. 14, 2014

(86) PCT No.: PCT/US2014/046487
§ 371 (c)(1),
(2) Date: Nov. 30, 2016

(87) PCT Pub. No.: WO2016/010509
PCT Pub. Date: Jan. 21, 2016

(65) Prior Publication Data
US 2017/0190962 A1 Jul. 6, 2017

(51) Int. Cl.
*E21B 43/267* (2006.01)
*E21B 33/138* (2006.01)
(Continued)

(52) U.S. Cl.
CPC ............. *C09K 8/805* (2013.01); *C09K 8/035* (2013.01); *C09K 8/56* (2013.01); *C09K 8/62* (2013.01); *E21B 43/26* (2013.01); *E21B 43/267* (2013.01)

(58) Field of Classification Search
CPC .. C09K 8/805; C09K 8/56; C09K 8/62; E21B 43/267; E21B 43/26; E21B 33/13; E21B 43/04; E21B 43/025
See application file for complete search history.

(56) References Cited

U.S. PATENT DOCUMENTS 6,311,773 B1 11/2001 Todd et al.
7,963,330 B2 6/2011 Nguyen et al.
(Continued)

FOREIGN PATENT DOCUMENTS

WO 2016/010509 1/2016

OTHER PUBLICATIONS

PCT International Search Report and Written Opinion, dated Mar. 31, 2015, Appl No. PCT/US2014/046487, "Plant Extracted Oil Based Polyepoxy Resin Composition for Improved Performance of Natural Sand Placed in Fracture," Filed Jul. 14, 2014, 14 pgs.

*Primary Examiner* — Zakiya W Bates
(74) *Attorney, Agent, or Firm* — Craig Roddy Tumey L.L.P.

(57) ABSTRACT

A method of treating a subterranean formation including providing a plant oil-based (POB) liquid hardenable resin, providing proppant particles, providing a hardening agent, combining the POB liquid hardenable resin and the hardening agent to form a resin compound, coating the resin compound onto at least a portion of the proppant particles to create resin-coated proppant particles, and placing the coated proppant particles into a subterranean formation zone, wherein the resin compound does not substantially cure prior to placing the resin coated proppant particles into the subterranean formation zone.

20 Claims, 2 Drawing Sheets

(51) Int. Cl.
*C09K 8/80* (2006.01)
*C09K 8/035* (2006.01)
*C09K 8/62* (2006.01)
*C09K 8/56* (2006.01)
*E21B 43/26* (2006.01)

(56) References Cited

U.S. PATENT DOCUMENTS

| | | |
|---|---|---|
| 8,613,320 B2 | 12/2013 | Nguyen et al. |
| 2004/0261995 A1 | 12/2004 | Nguyen et al. |
| 2006/0089266 A1 | 4/2006 | Dusterhoft et al. |
| 2007/0287767 A1 | 12/2007 | Ballard |
| 2008/0045421 A1 | 2/2008 | Nelson et al. |

FIG. 2

PLANT EXTRACTED OIL BASED POLYEPOXY RESIN COMPOSITION FOR IMPROVED PERFORMANCE OF NATURAL SAND PLACED IN FRACTURE

BACKGROUND

The present invention generally relates to the use of curable resin treatment fluids in subterranean operations, and, more specifically, to the use of hardenable plant oil based resin treatment fluids comprising hardenable plant oil based resin compounds and natural sand, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Conventional treatment methods involve treating the porous, unconsolidated mass sand around the wellbore in order to cement the loose sand grains together, thereby forming a permeable consolidated sand mass which will allow production of fluids but which will restrain the movement of sand particles into the wellbore. These procedures create a permeable barrier or sieve adjacent to the perforations or other openings in the well casing which establish communication between the production formation and the production tubing, which restrains the flow of loose particulate mineral matter such as sand.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. To accomplish this, a viscous fracturing fluid may be pumped down the casing to the formation at a rate and a pressure sufficient to form fractures that extend into the formation, providing additional pathways through which the oil or gas can flow to the well. A proppant is a solid material, typically treated sand or man-made ceramic materials, designed to keep an induced hydraulic fracture open, during or following a fracturing treatment. It is added to the fracturing fluid. After the fracturing procedure has been completed, it may be desirable to consolidate the proppant materials.

Typical sand consolidation treatments use plastic resins, and are not entirely satisfactory. Resins tend to reduce the permeability of the consolidated formation below acceptable levels. The toxicity of the plastic resins may also be an environmental issue. In addition, natural sand, although readily available, may not form, with traditional resins, a consolidated proppant useful in reservoirs with high overburden stresses, thereby requiring the use of more expensive man-made proppants.

Accordingly, an ongoing need exists for environmentally friendly resin systems allowing the use of natural sand and or man-made proppant for consolidating and fracturing operations in subterranean formations.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention discloses a coating system that enhances the physical properties of natural sand in order to be used for high temperature high pressure HTHP wells. Typically for this type of application, either a wet coating or dry coating procedure is followed. However, in some embodiments, the proppant is coated on the fly to increase the proppant strength by creating grain to grain contact. On the fly coating also helps in ensuring uniform coating of sand grains without losing the coating material to fracturing fluids. Prolonged exposure of the resin (on the proppant surface) at elevated temperatures and stress conditions within fractures further helps in increasing the bonds between resin and thereby forcing the proppant to stay together as a hard solid mass as the fracture heals and closes onto the proppant. This mechanism helps in preventing proppant flowback due to increased strength of sand as overburden stress increases.

In various embodiments, plant oil based epoxy resins with a hardener may be used to increase the strength of sand so that it can be used for higher overburden stresses (greater than about 6000 PSI) in fracturing applications.

In some embodiments of the present invention, a method of treating a wellbore in a subterranean formation includes providing a plant oil-based (POB) liquid hardenable resin, providing proppant particles, providing a hardening agent, combining the POB liquid hardenable resin and the hardening agent to form a resin compound, coating the resin compound onto at least a portion of the proppant particles to create resin-coated proppant particles, and placing the coated proppant particles into a subterranean formation zone, wherein the resin compound does not substantially cure prior to placing the resin coated proppant particles into the subterranean formation zone. In certain embodiments, the POB liquid hardenable resin comprises at least one of a vegetable oil, an epoxidised vegetable oil, an epoxy derivative of monoglyceride of vegetable oil, fruit oil, and combinations thereof. In other embodiments, any natural oil containing triglyceride functionality is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof. In a preferred embodiment, the plant oil is soybean oil. In an embodiment, the hardening agent comprises at least one compound selected from the group consisting of amines, amides, acids, anhydrides, phenols, thiols and combinations thereof. In certain embodiments, the ratio of POB liquid hardenable resin to hardening agent is about 7:3 by volume. In other embodiments, the resin-hardener volume by weight of sand is about 3% to about 15% or higher depending on the sand quality. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In an embodiment, the proppant is a good quality sand or a sand of lesser quality. In a preferred embodiment, the proppant is a poor quality sand. In an exemplary embodiment, the subterranean zone has overburden stresses of about 6000 PSI or more. In some embodiments, the zone comprises proppant particles forming a proppant pack in a fracture. In other embodiments, at least a portion of the hardening agent is encapsulated in a hydrolysable material. In yet another embodiment, a carrier fluid is combined with the coated proppant particles and placed in the zone.

In a further embodiment, a method includes providing a plant oil-based (POB) liquid hardenable resin, providing proppant particles, providing a hardening agent, combining the POB liquid hardenable resin and the hardening agent to form a resin compound, and coating the resin compound onto at least a portion of the proppant particles to create resin-coated proppant particles, wherein the resin compound does not substantially cure during coating. In certain embodiments, the POB liquid hardenable resin comprises at least one of a vegetable oil, an epoxidised vegetable oil, an epoxy derivative of monoglyceride of vegetable oil, fruit oil, and combinations thereof. In other embodiments, the plant oil is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof. In a preferred embodiment, the plant oil is soybean oil. In an embodiment, the hardening agent comprises at least one compound selected from the group consisting of amines, amides, acids, anhydrides, phenols, thiols and combinations thereof. In certain embodiments, the ratio of POB liquid hardenable resin to hardening agent is about 7:3 by volume. In other embodiments, the resin-hardener volume by weight of sand is about 3% to about 15%. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In a preferred embodiment, the proppant is sand.

In an embodiment, a method of treating a subterranean formation includes providing a plant oil-based (POB) liquid hardenable resin, providing proppant particles, providing a hardening agent, combining the POB liquid hardenable resin and the hardening agent to form a resin compound, coating the resin compound onto at least a portion of the proppant particles to create resin-coated proppant particles, providing a fracturing fluid, mixing the resin-coated proppant particles with the fracturing fluid, and placing the fracturing fluid into a subterranean formation zone at a pressure sufficient to extend or create at least one fracture in the subterranean formation zone, wherein the resin compound does not substantially cure prior to placing the resin coated proppant particles into the subterranean formation zone. In certain embodiments, the POB liquid hardenable resin comprises at least one of a vegetable oil, an epoxidised vegetable oil, an epoxy derivative of monoglyceride of vegetable oil, fruit oil, and combinations thereof. In other embodiments, the plant oil is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof. In a preferred embodiment, the plant oil is soybean oil. In an embodiment, the hardening agent comprises at least one compound selected from the group consisting of amines, amides, acids, anhydrides, phenols, thiols and combinations thereof. In certain embodiments, the ratio of POB liquid hardenable resin to hardening agent is about 7:3 by volume. In other embodiments, the resin-hardener volume by weight of sand is about 3% to about 15%. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In a preferred embodiment, the proppant is sand. In an exemplary embodiment, the subterranean zone has overburden stresses of about 6000 PSI or more. In some embodiments, the zone comprises proppant particles forming a proppant pack in a fracture. In other embodiments, at least a portion of the hardening agent is encapsulated in a hydrolysable material.

An embodiment of the invention includes A method of treating a subterranean formation comprising: combining a plant oil-based POB liquid hardenable resin, a hardening agent and proppant particles to form resin coated proppant particles, placing the coated proppant particles into a subterranean formation zone, wherein the resin does not substantially cure prior to placing the resin coated proppant particles into the subterranean formation zone. In certain embodiments, the POB liquid hardenable resin comprises at least one of a vegetable oil, an epoxidised vegetable oil, epoxy derivative of monoglyceride of vegetable oil, fruit oil, and combinations thereof. In other embodiments, any natural oil containing triglyceride functionality is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof. In a preferred embodiment, the plant oil is soybean oil. In an embodiment, the hardening agent comprises at least one compound selected from the group consisting of amines, amides, acids, anhydrides, phenols, thiols and combinations thereof. In certain embodiments, the ratio of POB liquid hardenable resin to hardening agent is about 7:3 by volume. In other embodiments, the resin-hardener volume by weight of sand is about 3% to about 15% or higher depending on the sand quality. In an embodiment, the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. In an embodiment, the proppant is a good quality sand or a sand of lesser quality. In a preferred embodiment, the proppant is a poor quality sand. In an exemplary embodiment, the subterranean zone has overburden stresses of about 6000 PSI or more. In some embodiments, the zone comprises proppant particles forming a proppant pack in a fracture. In other embodiments, at least a portion of the hardening agent is encapsulated in a hydrolysable material. In yet another embodiment, a carrier fluid is combined with the coated proppant particles and placed in the zone. In some embodiments, the proppant particles are at least partially coated with the POB liquid hardenable resin before the hardening agent is combined with the at least partially coated particles.

An additional embodiment of the invention includes a well treatment system comprising: a well treatment apparatus configured to provide a plant oil-based (POB) liquid hardenable resin, provide proppant particles, provide a hardening agent, combine the POB liquid hardenable resin and the hardening agent to form a resin compound, coat the resin compound onto at least a portion of the proppant particles to create resin-coated proppant particles, and place the coated proppant particles into a subterranean formation zone, wherein the resin compound, wherein the resin compound does not substantially cure prior to placing the resin coated proppant particles into the subterranean formation zone.

In many embodiments, the advantages of the invention include excellent unconfined compressive strength (UCS) and permeability values compared to traditional epoxy systems, and the use of natural sand in wells with high overburden stresses. Thus, in most places where natural sand is present in abundance, man-made proppants may not be required for use in fractures. POB resins have low toxicity organic compounds and lack heavy metals.

Carrier Fluids

In some embodiments, carrier fluids are used to deliver the hardened POB resin coated proppants into a wellbore. These fluids may be traditional drilling fluids, completion fluids, or fracturing fluids. The carrier fluids may be slick water with surfactants, fracturing fluids and brine. In certain embodiments, the carrier fluid comprises a non-aqueous base fluid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof.

Aqueous Base Fluids

The aqueous base fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm$^3$ or greater).

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid.

Plant Oil Based (POB) Liquid Hardenable Resins

Treatment fluids of the present invention comprise a plant oil based liquid hardenable resin. These plant oils include natural vegetable oils, which are triacylglycerols of fatty acids. They contain suitable functionalities in their backbone such as double bonds, epoxies, hydroxyls, esters and other functional groups that can undergo several chemical reactions including hydrogenation, tranesterification, auto-oxidation, epoxidation, hydroxylation, acrylation, isocyanation, and others. In a preferred embodiment, the plant oil is any that can undergo epoxidation.

In some embodiments, the POB liquid hardenable resin comprises at least one of a vegetable oil, an epoxidised vegetable oil, an epoxy derivative of monoglyceride of vegetable oil, fruit oil, and combinations thereof. In further embodiments, the plant oil is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof. In a preferred embodiment, the plant oil is soybean oil.

In various embodiments, the ratio of POB liquid hardenable resin to hardening agent is from about 100:1 to about 1:100 by volume. Or more preferably, the ratio of POB liquid hardenable resin to hardening agent is from about 8:2 to about 2:8 by volume. In a preferred embodiment, the ratio is about 7:3.

In exemplary embodiments, the resin-hardener volume by weight of sand is about 0.05% to about 100%. Alternatively, the maximum limit up to which the resin-hardener volume can be used is the amount sufficient to completely block the proppant pack porosity, either consolidated or unconsolidated formation. Preferred ranges can vary between about 1% to about 20% depending upon sand size and quality. More preferably, the range should be about 3% to about 15%. A preferred embodiment is about 3%. An additional preferred embodiment is about 15%.

Hardening Agents

The treatment fluids of the present invention also include a hardening agent. In some embodiments, the hardening agent is any compound that is capable of reacting with POB liquid hardenable resin to form very high molecular weight multi dimensional polymeric chains.

Non-limiting examples of hardening agents include at least one member selected from the group consisting of amines, amides, acids, anhydrides, phenols, thiols, and combinations thereof. In an embodiments, amine based hardening agents are utilized.

One of skill in the art will realize that the curing time is determined by many factors including resin-hardener combinations, resin-hardener mix ratios, temperature, and pressure.

An example of a commercially available POB resin and hardener system is EcoPoxy™ slow kit and EcoPoxy™ medium kit, both available from EcoPoxy™ Systems, Morris Manitoba, Canada. EcoPoxy™ is a soybean oil based polyepoxy resin and the hardener includes a modified polyamine reaction product, ethylene amine, bosphenol A, benzyl alcohol, and soybean oil.

In some embodiments, hardener is encapsulated in a hydrolysable material. In certain embodiments, the encapsulated hydrolysable material forms a capsule. Using encapsulated well treatment chemicals permits blending of normally incompatible compounds in the treatment fluid. As a non-limiting example, the present invention permits the transport of the hardener to a downhole environment by a treatment fluid having a neutral or basic pH without detrimentally impacting either the treatment fluid or the hardener. A non-limiting list of mechanisms suitable for releasing the encapsulated hardener includes: a change in pH, crushing, rupture, dissolution of the membrane, diffusion and/or thermal melting of the encapsulating membrane. Following placement of the compounds downhole, the hardener is released from the capsules and allowed to react. The controlled downhole release of the hardener allows for delayed curing of the POB resins and proppants.

In various embodiments, the ratio of POB liquid hardenable resin to hardening agent is from about 2:1 to about 7:3 by volume. In a preferred embodiment, the ratio is about 7:3. In some embodiments, the resin-hardener volume by weight of sand is about 0.05% to about 100%. In exemplary embodiments, the resin-hardener volume by weight of sand is about 3% to about 15%. A preferred embodiment is about 3%. An additional preferred embodiment is about 15%.

Having the benefit of the present disclosure and knowing the temperature and chemistry of a subterranean formation of interest, one having ordinary skill in the art will be able to choose a resin-hardener combination and an amount thereof suitable for producing a desired coating of the proppant particulates.

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition. In some embodiments, the sand may be graded sand that is sized based on knowledge of the size of the lost circulation zone. The graded sand may have a particle size in the range of from about 10 to about 70 mesh, U.S. Sieve Series. In a preferred embodiment, 20/40 natural silica sand is used. In addition to best quality natural sand like Brady Sand or Northern White Sand; lower quality sand, i.e. sand having higher amount of impurities, higher amount of acid soluble materials and will give greater than about 10% fines even at lower overburden stresses like 2000 psi; may be used with this invention. For purposes of this disclosure, "poor quality sand" is any sand that exhibits at least one property of a) having a higher amount of impurities than Brady Sand or Northern White Sand, b) having a higher amount of acid soluble materials than Brady Sand or Northern White Sand, and c) giving greater than about 10% fines at lower overburden stresses such as those below about 2000 psi, and combinations thereof. Some non-limiting examples of poor quality sand include Nodosaria blanpiedi (NB), and River Sand.

In certain embodiments, the proppants are present in an amount of about 0.05% to about 60%. In exemplary embodiments, less than about 5% by volume of the treatment fluid. In other embodiments, the proppants are present in an amount of less than about 3% by volume of the treatment fluid.

In some embodiments, the proppants are coated with a POB liquid hardenable resin and a hardening agent before they have been placed downhole. In other embodiments, the proppants are coated after they have been placed in the subterranean formation.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable. Other potential applications of this resin system, with some minor adjustments such as modifying the dilution factor with the solvent carrier or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid is placed into a wellbore as a single stream and activated by downhole conditions to form a barrier that substantially seal lost circulation zones or other undesirable flowpaths.

In an embodiment, the consolidation treatment fluid may be introduced into the wellbore, the formation, or a lost circulation zone as a single pill fluid. That is, in such an embodiment, all components of the consolidation treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

For purposes of this disclosure, "overburden stress" refers to the load per unit area or stress overlying an area or point of interest in the subsurface from the weight of the overlying sediments and fluids. As an example, the "overburden stress" may be the load per unit area or stress overlying the hydrocarbon-bearing zone that is being conditioned or produced according to the embodiments described herein. In general, the magnitude of the overburden stress may primarily depend on two factors: 1) the composition of the overlying sediments and fluids, and 2) the depth of the subsurface area or formation. Similarly, underburden refers to the subsurface formation underneath the formation containing one or more hydrocarbon-bearing zones (reservoirs).

In various embodiments, systems configured for delivering the treatment fluids described herein to a downhole location are described. In various embodiments, the systems can comprise a pump fluidly coupled to a tubular, the tubular containing the hardenable acid curing resin and hydrolysable dimer acid ester compositions, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 1:
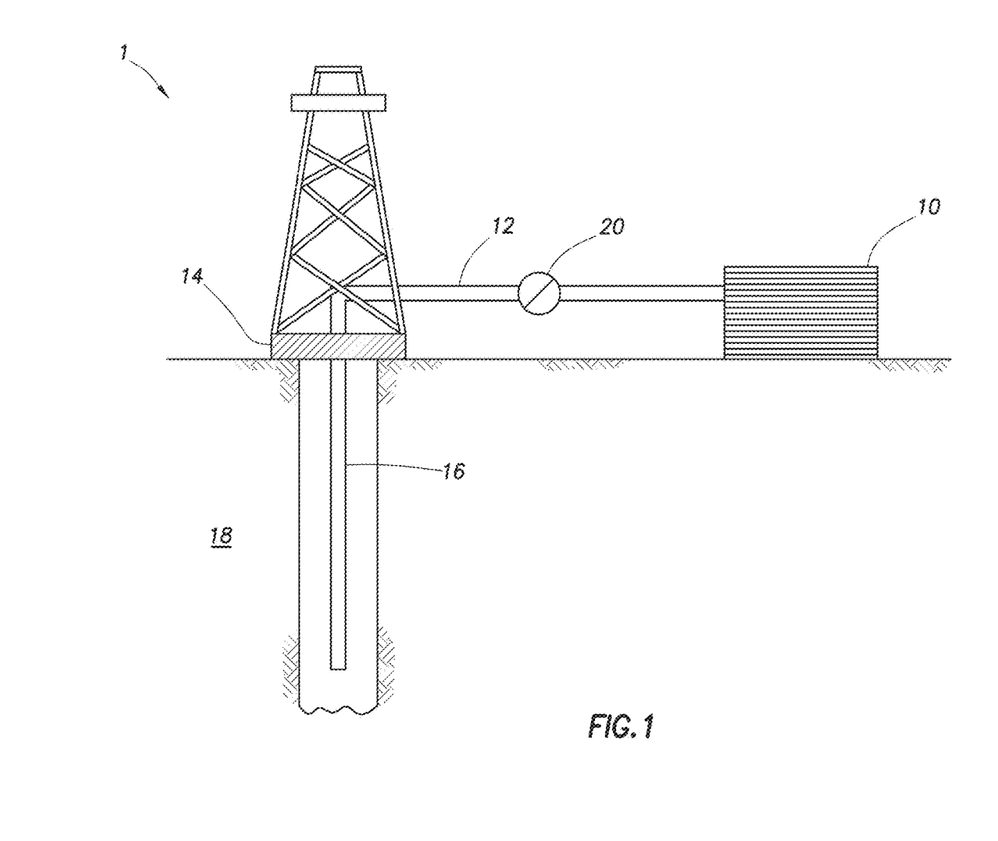
FIG. 1 depicts an embodiment of a system configured for delivering the consolidating agent composition comprising treatment fluids of the embodiments described herein to a downhole location.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

One of skill in the art will appreciate the many advantages of the present invention. The invention offers an environmentally acceptable resin system that may be used for on the fly coating. Various embodiments also increase the strength of ordinary sand, thereby reducing the need for expensive man-made proppants. Further, the invention is compatible with most fracturing fluids. Additionally, the resin concentration can be varied as per reservoir conditions with respect to temperature. Thus, one system may be sufficient for use over a wide range of temperatures 60° F. to 450° F.). The invention may also be modified to suit varied reservoir conditions of overburden stresses. There are no anticipated pumping issues from a field equipment point of view due to the low initial viscosity due to the non-crosslinked state. Use of the compositions and methods of the present invention may provide higher conductivities, longer fracture life, and little or no proppant flowback.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Experiments:

20/40 natural silica sand used for the test was locally available Saudi sand obtained from commercial vendor "Adwan Chemical Industries Co. Ltd." The resin-hardeners (R-H) utilized were EcoPoxy™ slow kit and EcoPoxy™ medium kit systems, procured from EcoPoxy Systems, Canada. Expedite 225™ System is a curable resin available from Halliburton Energy Services, Inc., Houston, Tex.

10 gm of sand was taken for each batch of resin R-H and were thoroughly mixed to ensure R-H uniformly coated the sand grains (Dry coating). For this process, 15% of R-H volume by weight of sand was desired. Multiple samples of dry coated sand for each concentration were prepared to conduct UCS and permeability measurements.

Figure 2:
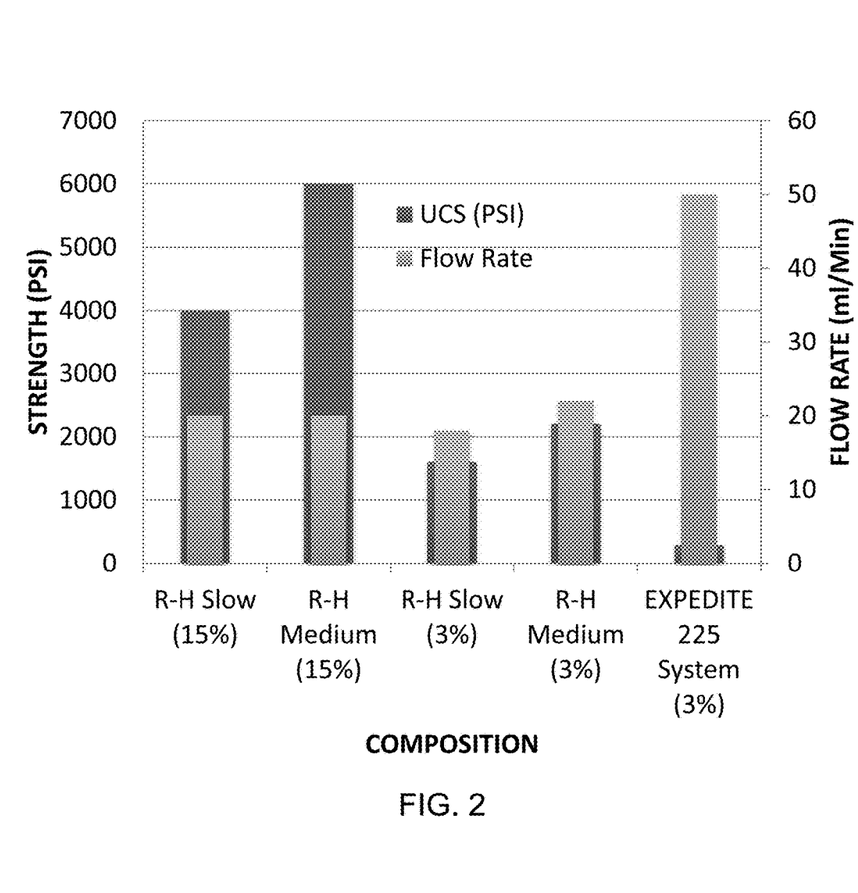
FIG. 2 is a chart showing the UCS and flow rate of different compositions prepared according to embodiments of the invention.

Once the sand was dry coated, it was placed in a 10 ml syringe and packed tightly. The coated sand was then cured at 83° C. (180° F.) for 4 hours and followed by UCS measurement of the respective consolidated sand core. Permeability of the coated sand cores was conducted by flowing tap water through the pack and measuring the flow rate at the end of 1 minute by maintaining constant head. Similar tests were also conducted with 3% resin-hardener volume by weight of sand. Results for 3% and 15% concentration of resin-hardener are given in Table 1 below. This invention was also compared with the existing Expedite 225™ System. 3% of Expedite225™ System (in a ratio of 7:3 resin to hardener) was taken and 10 gm of 20/40 sand was dry coated with this Expedite 225™ System. The coated sand was cured at 83° C. (180° F.) for 4 hours. These results of UCS and time required to flow water through the consolidated sand pack after curing are presented in Table 1 and in FIG. 2.

TABLE 1

| No. | Composition | UCS (PSI) | Flow Rate |
| --- | --- | --- | --- |
| 1 | R-H Slow (15%) | 4000 | 20 ml in 1 minute |
| 2 | R-H Medium (15%) | 6000 | 20 ml in 1 minute |
| 3 | R-H Slow (3%) | 1600 | 18 ml in 1 minute |
| 4 | R-H Medium (3%) | 2200 | 22 ml in 1 minute |
| 5 | Expedite 225 System (3%) | 287 | 50 ml in 1 minute |

One of skill in the art will appreciate the higher UCS values of the present invention. Also, in spite of the high UCS with the 15% resin, significant permeability was observed. Also of note is that slow and/or medium hardener systems can be used for improving performance of sand to suit given reservoir conditions. Even though slow hardener compositions require longer time to cure completely, they may provide higher strength over medium hardener compositions.

Table 2 represents similar tests to those performed above except that a 20 pound linear gel WG-11™ Gelling Agent is present, the temperature is about 300° F., and the curing pressure is 3000 psi. WG-11™ agent is a chemically modified, low-residue guar gelling agent used in aqueous fracturing fluids and is available from Halliburton Energy Services, Inc., Houston, Tex.

TABLE 2

| No. | Composition | Curing Duration (hrs) | UCS (PSI) |
|---|---|---|---|
| 1 | R-H Slow (3%) | 24 | 224 |
| 2 | R-H Slow (3%) | 48 | 114 |
| 3 | R-H Slow (3%) | 72 | 114 |
| 4 | R-H Medium (3%) | 4 | 458 |
| 5 | R-H Medium (3%) | 24 | 320 |
| 6 | R-H Medium (3%) | 48 | 235 |
| 7 | R-H Medium (3%) | 72 | 284 |

Embodiments disclosed herein include:

A: A method providing a plant oil-based (POB) liquid hardenable resin, providing proppant particles; providing a hardening agent, combining the POB liquid hardenable resin and the hardening agent to form a resin compound, coating the resin compound onto at least a portion of the proppant particles to create resin-coated proppant particles, and placing the coated proppant particles into a subterranean formation zone, wherein the resin compound does not substantially cure prior to placing the resin coated proppant particles into the subterranean formation zone.

B: A method comprising: providing a plant oil-based (POB) liquid hardenable resin, providing proppant particles, providing a hardening agent, combining the POB liquid hardenable resin and the hardening agent to form a resin compound, and coating the resin compound onto at least a portion of the proppant particles to create resin-coated proppant particles, wherein the resin compound does not substantially cure during coating.

C: A method comprising: providing a plant oil-based (POB) liquid hardenable resin, providing proppant particles, providing a hardening agent, combining the POB liquid hardenable resin and the hardening agent to form a resin compound, coating the resin compound onto at least a portion of the proppant particles to create resin-coated proppant particles, providing a fracturing fluid, mixing the resin-coated proppant particles with the fracturing fluid, and placing the fracturing fluid into a subterranean formation zone at a pressure sufficient to extend or create at least one fracture in the subterranean zone, wherein the resin compound does not substantially cure prior to placing the resin coated proppant particles into the subterranean formation zone.

D: A well treatment system comprising: a well treatment apparatus configured to, provide a plant oil-based (POB) liquid hardenable resin, provide proppant particles, provide a hardening agent, combine the POB liquid hardenable resin and the hardening agent to form a resin compound, coat the resin compound onto at least a portion of the proppant particles to create resin-coated proppant particles, and place the coated proppant particles into a subterranean formation zone, wherein the resin compound, wherein the resin compound does not substantially cure prior to placing the resin coated proppant particles into the subterranean formation zone.

E: A method of treating a subterranean formation comprising: combining a plant oil-based POB liquid hardenable resin, a hardening agent and proppant particles to form resin coated proppant particles, placing the coated proppant particles into a subterranean formation zone, wherein the resin does not substantially cure prior to placing the resin coated proppant particles into the subterranean formation zone.

Each of embodiments A, B, C, D, and E may have one or more of the following additional elements: Element 1: wherein the POB liquid hardenable resin comprises at least one of a vegetable oil, an epoxidised vegetable oil, an epoxy derivative of monoglyceride of vegetable oil, fruit oil, and combinations thereof. Element 2: wherein the plant oil is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof. Element 3: wherein the plant oil is soybean oil. Element 4: wherein the hardening agent comprises at least one compound selected from the group consisting of amines, amides, acids, anhydrides, phenols, thiols and combinations thereof. Element 5: wherein the ratio of POB liquid hardenable resin to hardening agent is from about 8:2 to about 2:8 by volume. Element 6: wherein the resin-hardener volume by weight of sand is about 3% to about 15%. Element 7: wherein the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. Element 8: wherein the proppant is poor quality sand. Element 9: wherein the subterranean zone has overburden stresses of about 6000 PSI or more. Element 10: wherein the zone comprises proppant particles forming a proppant pack in a fracture within the subterranean formation zone. Element 11: wherein at least a portion of the hardening agent is encapsulated in a hydrolysable material. Element 12: further comprising a carrier fluid, wherein coated proppant particles are combined with the carrier fluid and placed in the subterranean formation zone.

Element 13: wherein the zone comprises proppant particles forming a proppant pack in a fracture. Element 14: wherein the poor sand is at least one selected from NB sand, river sand, and combinations thereof. Element 15: wherein the proppant particles are at least partially coated with the POB liquid hardenable resin before the hardening agent is combined with the at least partially coated particles.

While preferred embodiments of the invention have been shown and described, modifications thereof can be made by one skilled in the art without departing from the teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method comprising:
   providing a plant oil-based (POB) liquid hardenable resin;
   providing proppant particles;

providing an amine hardening agent encapsulated by a hydrolysable material;
combining the POB liquid hardenable resin and the hardening agent to form a resin compound;
coating the resin compound onto at least a portion of the proppant particles to create resin-coated proppant particles;
preparing a fracturing fluid comprising the resin coated particles and a slickwater carrier fluid;
pumping the fracturing fluid into a subterranean formation zone penetrated by a wellbore at a pressure above a fracture gradient of the subterranean formation zone and creating or extending at least one fracture within the subterranean formation zone;
forming a proppant pack in the at least one fracture;
dissolving the hydrolysable material; and
curing the resin compound to form a cured proppant pack.

2. The method of claim 1, wherein the POB liquid hardenable resin comprises at least one of a vegetable oil, an epoxidised vegetable oil, an epoxy derivative of monoglyceride of vegetable oil, fruit oil, and combinations thereof.

3. The method of claim 2, wherein the plant oil is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof.

4. The method of claim 3, wherein the plant oil is soybean oil.

5. The method of claim 1, wherein the ratio of POB liquid hardenable resin to hardening agent is from about 8:2 to about 2:8 by volume.

6. The method of claim 1, wherein a volume by weight ratio of the resin compound to the sand is about 3% to about 15%.

7. The method of claim 1, wherein the proppant is at least one selected from sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof.

8. The method of claim 7, wherein the proppant is poor quality sand.

9. The method of claim 1, wherein the subterranean zone has overburden stresses of about 6000 PSI or more.

10. A method comprising:
providing a plant oil-based (POB) liquid hardenable resin;
providing proppant particles;
providing an amine hardening agent encapsulated by a hydrolysable material;
combining the POB liquid hardenable resin and the hardening agent to form a resin compound; and
coating the resin compound onto at least a portion of the proppant particles to create resin-coated proppant particles, wherein the resin compound does not substantially cure during coating.

11. The method of claim 10, wherein the POB liquid hardenable resin comprises at least one of a vegetable oil, an epoxidised vegetable oil, an epoxy derivative of monoglyceride of vegetable oil, fruit oil, and combinations thereof.

12. The method of claim 11, wherein the plant oil is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof.

13. A method comprising:
providing a plant oil-based (POB) liquid hardenable resin;
providing proppant particles wherein the proppant particles produce greater than about 10% fines at overburden stress below about 2000 psi;
providing an amine hardening agent encapsulated by a hydrolysable material;
combining the POB liquid hardenable resin and the hardening agent to form a resin compound;
coating the resin compound onto at least a portion of the proppant particles to create resin-coated proppant particles;
providing a fracturing fluid;
mixing the resin-coated proppant particles with the fracturing fluid; and
placing the fracturing fluid into a subterranean formation zone at a pressure sufficient to extend or create at least one fracture in the subterranean zone, wherein the resin compound does not substantially cure prior to placing the resin coated proppant particles into the subterranean formation zone.

14. The method of claim 13, wherein the zone comprises proppant particles forming a proppant pack in a fracture.

15. The method of claim 13, wherein subterranean zone has overburden stresses of about 6000 PSI or more.

16. A method of treating a subterranean formation comprising:
combining a plant oil-based POB liquid hardenable resin, a hardening agent selected from the group consisting of amines, amides, acids, phenols, thiols and combinations thereof, and proppant particles to form resin coated proppant particles, wherein the hardening agent is encapsulated by a hydrolysable material;
placing the coated proppant particles into a subterranean formation zone, wherein the resin does not substantially cure prior to placing the resin coated proppant particles into the subterranean formation zone.

17. The method of claim 16, wherein the POB liquid hardenable resin comprises at least one of a vegetable oil, an epoxidised vegetable oil, an epoxy derivative of monoglyceride of vegetable oil, fruit oil, and combinations thereof.

18. The method of claim 17, wherein the plant oil is at least one selected from linseed oil, soybean oil, palm oil, coconut oil, *argemone* oil, *pongamia* oil, jatropha oil, laurel oil, neem oil, cottonseed oil, *vernonia* oil, *Annona squamosa* oil, *Catunaregam nilotica* oil, rubber seed oil, crabe oil, J. curcas oil, rapeseed oil, canola oil, sunflower oil, safflower oil, maize oil, sandalwood oil, castor oil, jojoba oil, peanut oil, cashew oil, sesame oil, olive oil, candle nut oil, and combinations thereof.

19. The method of claim 16, wherein the proppant particles are at least partially coated with the POB liquid hardenable resin before the hardening agent is combined with the at least partially coated particles.

20. A well treatment system comprising:
a well treatment apparatus configured to:
provide a plant oil-based (POB) liquid hardenable resin;
provide proppant particles;
provide an amine hardening agent encapsulated by a hydrolysable material;

combine the POB liquid hardenable resin and the hardening agent to form a resin compound;

coat the resin compound onto at least a portion of the proppant particles to create resin-coated proppant particles; and place the coated proppant particles into a subterranean formation zone, wherein the resin compound does not substantially cure prior to placing the resin coated proppant particles into the subterranean formation zone.

* * * * *